(12) United States Patent
Guidry et al.

(10) Patent No.: US 9,810,354 B2
(45) Date of Patent: *Nov. 7, 2017

(54) CONNECTION METHODS AND SYSTEMS

(71) Applicant: Cameron International Corporation, Houston, TX (US)

(72) Inventors: Kirk P. Guidry, Cypress, TX (US); Dennis P. Nguyen, Pearland, TX (US); Joseph R. Wilhelmi, Houston, TX (US); Terry L. Shinn, Houston, TX (US)

(73) Assignee: Cameron International Corporation, Houston, TX (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/251,563

(22) Filed: Apr. 11, 2014

(65) Prior Publication Data

US 2014/0217724 A1    Aug. 7, 2014

Related U.S. Application Data

(63) Continuation of application No. 13/707,574, filed on Dec. 6, 2012, now Pat. No. 8,696,039, which is a
(Continued)

(51) Int. Cl.
*F16L 19/02*        (2006.01)
*E21B 17/046*    (2006.01)
*E21B 33/038*    (2006.01)

(52) U.S. Cl.
CPC ........ *F16L 19/0206* (2013.01); *E21B 17/046* (2013.01); *E21B 33/038* (2013.01); *Y10T 29/49947* (2015.01)

(58) Field of Classification Search
CPC ...... F16L 19/0231; F16L 19/005; F16L 19/04
(Continued)

(56) References Cited

U.S. PATENT DOCUMENTS 579,986 A * 4/1897 Jordan ................. 285/334.1
883,080 A * 3/1908 Bullock ................. 285/329
(Continued)

FOREIGN PATENT DOCUMENTS

| GB | 2142402 | 1/1985 |
| GB | 2415212 | 12/2005 |
| WO | 2008154076 | 12/2008 |

OTHER PUBLICATIONS

PCT International Search Report and Written Opinion for PCTUS2009/030489, dated Nov. 12, 2009.
(Continued)

*Primary Examiner* — David E Bochna
(74) *Attorney, Agent, or Firm* — Fletcher Yoder, P.C.

(57) ABSTRACT

Various novel connectors are provided. In one embodiment, the connector includes a collar configured to receive first and second components. In this embodiment, the connector may also include a load ring configured to be received in a groove of the second component and to move into and out of engagement with the collar when the second component is received by the collar. The connector of this illustrative embodiment may also include a cotter configured for installation to the second component and to inhibit disengagement of the load ring from the collar. In some embodiments, engagement of the load ring and the collar effects securing of the first and second components to one another. Other devices, systems, and methods related to connectors are also disclosed.

33 Claims, 18 Drawing Sheets

Related U.S. Application Data continuation of application No. 12/746,922, filed as application No. PCT/US2009/030489 on Jan. 8, 2009, now Pat. No. 8,328,242.

(60) Provisional application No. 61/022,622, filed on Jan. 22, 2008.

(58) Field of Classification Search
USPC ........ 285/388, 387, 321, 414, 415; 166/381, 166/217
See application file for complete search history.

(56) References Cited

U.S. PATENT DOCUMENTS

| | | | |
|---|---|---|---|
| 1,016,620 A | 2/1912 | Gapp | |
| 1,119,752 A * | 12/1914 | Goethner et al. | 285/278 |
| 1,186,325 A * | 6/1916 | Metzger | 285/388 |
| 1,217,804 A * | 2/1917 | Metzger | 285/388 |
| 1,703,696 A * | 2/1929 | Stratford | 285/388 |
| 2,125,677 A | 8/1938 | Kuchenmeister | |
| 2,154,526 A * | 4/1939 | Parkerton | 285/355 |
| 2,443,394 A * | 6/1948 | Le Clair | 285/388 |
| 3,361,453 A | 1/1968 | Brown et al. | |
| 4,046,405 A | 9/1977 | Bonds | |
| 4,240,654 A | 12/1980 | Gladieux | |
| 4,469,172 A | 9/1984 | Clark | |
| 4,524,825 A | 6/1985 | Fore | |
| 4,610,465 A | 9/1986 | Boyadjieff | |
| 4,676,479 A | 6/1987 | Ogawa et al. | |
| 4,681,166 A | 7/1987 | Cuiper | |
| 4,886,121 A | 12/1989 | Demny et al. | |
| 4,921,284 A * | 5/1990 | Singeetham | 285/363 |
| 5,002,129 A | 3/1991 | Hopper | |
| 6,508,493 B1 | 1/2003 | Guivarc'h | |
| 6,540,024 B2 | 4/2003 | Pallini et al. | |
| 6,557,905 B2 * | 5/2003 | Mack et al. | 285/387 |
| 6,695,356 B2 | 2/2004 | Nguyen et al. | |
| 6,905,148 B2 | 6/2005 | Nguyen et al. | |
| 7,150,323 B2 | 12/2006 | Ford | |
| 7,434,848 B2 * | 10/2008 | Boyd | 285/370 |
| 8,328,242 B2 | 12/2012 | Guidry et al. | |
| 8,696,039 B2 * | 4/2014 | Guidry et al. | 285/321 |
| 2001/0045286 A1 | 11/2001 | Pallini et al. | |
| 2003/0095830 A1 | 5/2003 | Nguyen et al. | |
| 2004/0155462 A1 * | 8/2004 | Nguyen et al. | 285/321 |
| 2007/0063513 A1 * | 3/2007 | Boyd | 285/371 |
| 2009/0033092 A1 * | 2/2009 | Boyd | 285/330 |

OTHER PUBLICATIONS

Singapore Search and Examination Report for SG Application No. 201102681-2; dated Sep. 23, 2013.
Singapore Written Opinion for SG Application No. 201004629-0; dated Mar. 7, 2011.
GB Search and Examination Report for GB Application No. GB1202686.0; dated Mar. 23, 2012.

* cited by examiner

CONNECTION METHODS AND SYSTEMS

CROSS REFERENCE TO RELATED APPLICATIONS

This application claims priority to and benefit of U.S. Non-Provisional application Ser. No. 13/707,574, entitled "Connection Methods and Systems," filed Dec. 6, 2012, issued as U.S. Pat. No. 8,696,039 on Apr. 15, 2014, which is herein incorporated by reference in its entirety, and which claims priority to and benefit of U.S. Non-Provisional application Ser. No. 12/746,922, entitled "Connection Methods and Systems," filed Jun. 8, 2010, issued as U.S. Pat. No. 8,328,242 on Dec. 11, 2012, which is herein incorporated by reference in its entirety, and which claims priority to and benefit of PCT Patent Application No. PCT/US2009/030489, entitled "Connection Methods and Systems," filed Jan. 8, 2009, which is herein incorporated by reference in its entirety, and which claims priority to and benefit of U.S. Provisional Patent Application No. 61/022,622, entitled "Connection Methods and Systems", filed on Jan. 22, 2008, which is herein incorporated by reference in its entirety.

FIELD OF THE INVENTION

The present invention relates generally to connection systems for various components, such as fluid conduits. More particularly, the present invention relates to various novel connectors for coupling a pair of components together in an end-to-end relationship.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, numerous companies invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components and/or conduits, such as various casings, valves, and the like, that control drilling and/or extraction operations. Additionally, various production and transport systems may also employ pipes or other fluid conduits, in addition to the components noted above.

As will be appreciated, various fluid conduits or other components of a production or transport system are typically coupled to one another to enable oil, gas, or the like to be extracted from the ground and routed to a desired location. Such fluid conduits (or "tubular members") are often coupled together in end-to-end relationships via various connectors that facilitate flow of oil, gas, or the like between the conduits. In some instances, these connectors may be subjected to large axial loads, such as gravity (particularly in the case of suspended conduits) or internal pressures within the conduits. Also, it will be appreciated that the space available for connecting conduit members may be limited in some applications. Consequently, there is a need for durable connectors that, among other things, have low profiles, provide sealed connections between two components (e.g., fluid conduits), and can withstand the axial loads expected within a given system.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention generally relate to novel connectors for joining two components, such as tubular members or conduits. In some exemplary embodiments, the exemplary connector includes a collar configured to receive each of the two components in an end-to-end arrangement. In one embodiment, the collar is configured to be threaded onto a first of the two components and to be coupled to the second of the two components via a load ring disposed between the collar and the second component. In such an embodiment, a locking key or cotter may be installed to facilitate positive engagement of the load ring with the collar.

In other embodiments, load rings may be provided in grooves of both of the two components to facilitate locking of the components to one another. In one embodiment, one or more anti-rotation rods may be installed, either permanently or temporarily, in either or both of the grooves to prevent rotation of the load rings during engagement by a collar. In various embodiments, the load rings may comprise C-rings, segmented rings, other split rings, or the like. Additionally, in various embodiments, rotation of the collar effects axial movement of one or both of the load rings to secure the two components to one another.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
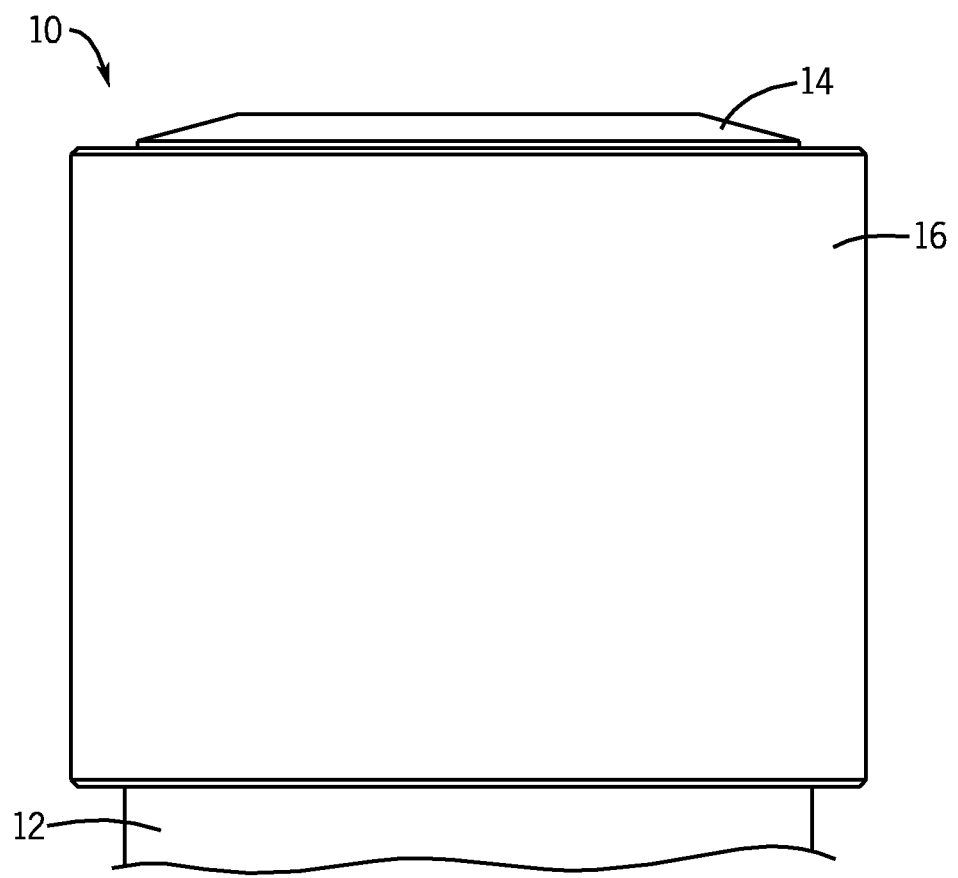
FIG. 1 is a front elevational view of a system including two connection members coupled to one another via a collar in accordance with one embodiment of the present invention.
Figure 2:
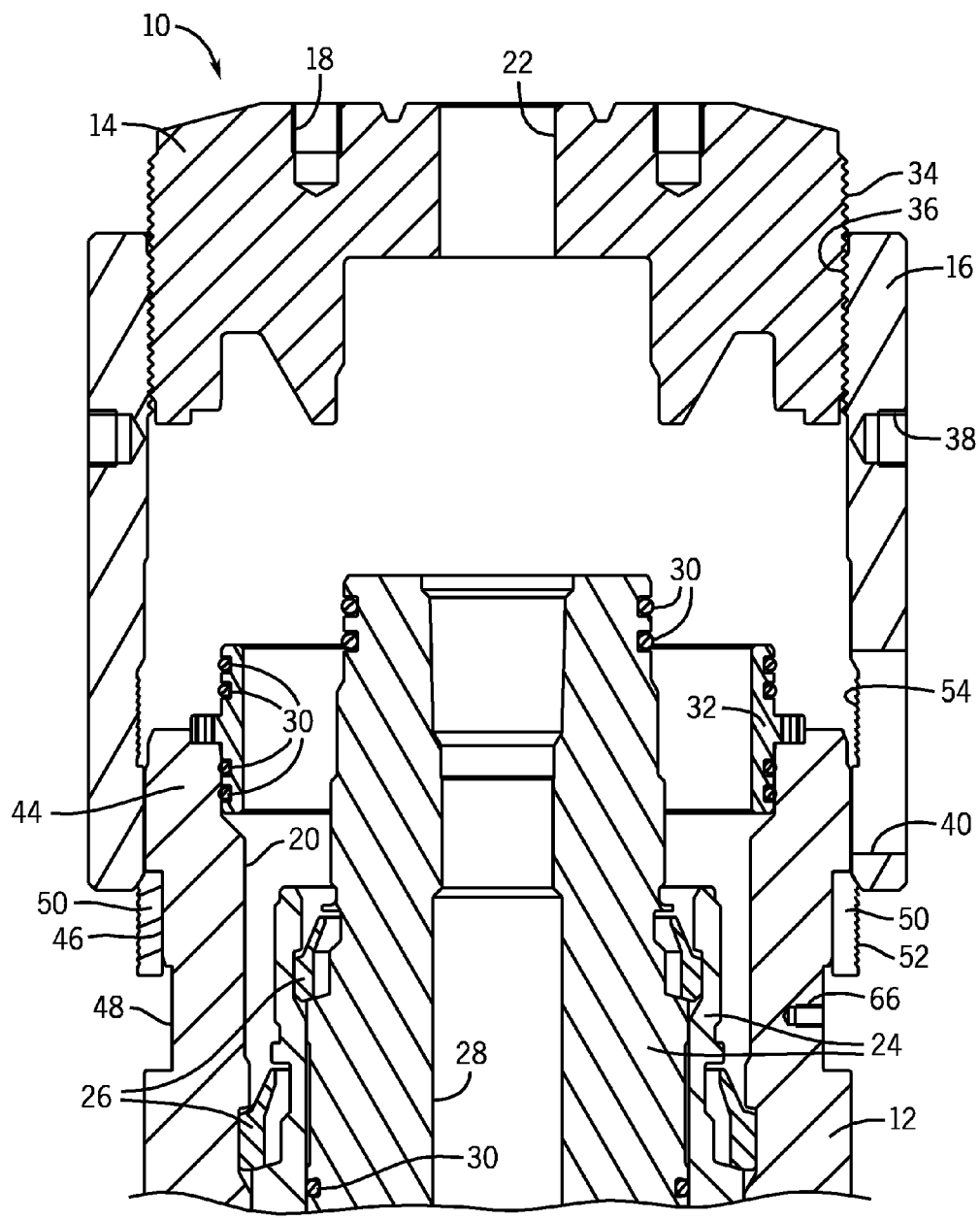
FIG. 2 is an exploded cross-sectional view of the system of FIG. 1, illustrating various features of the exemplary system, including a load ring disposed in a groove of one of the connection members, in accordance with one embodiment of the present invention.

Turning now to the present figures, an exemplary system 10 including a stab-type connector is illustrated in FIGS. 1 and 2 in accordance with one embodiment of the present invention. The exemplary system 10 includes a pair of connection members configured to be coupled to one another, such as a pin member or component 12 coupled to a box member or component 14. In one embodiment, the connector of the system 10 includes a union ring or collar 16 configured to cooperate with a load ring 50 and a locking key or cotter 60 to secure the pin member 12 to the box member 14, as discussed in greater detail below. While certain components may be referred to herein as pin members or box members, it should be noted that such references are provided for the sake of clarity, and that such components (or features thereof) may be reversed in accordance with certain embodiments. For instance, in one embodiment, the members 12 and 14 could instead be configured as a box member and a pin member, respectively, in full accordance with the present techniques.

Either or both of the pin member 12 and the box member 14 may include various mounting features 18, such as recesses, to facilitate coupling of such members to one or more additional components. In some embodiments, the pin and box members 12 and 14 are configured to enable coupling of various tubular members to one another. For example, each of the pin member 12 and the box member 14 may be coupled to a respective pipe via recesses or some other mounting features 18, allowing the two pipes to be secured to one another via the connector. Similarly, the pin and box members 12 and 14 could also be used to couple various other components together, such as a pipe to a wellhead component, a first wellhead component to a second wellhead component (e.g., in a stacked wellhead arrangement), or the like.

While the mounting features 18 in the presently illustrated embodiment include recesses configured to receive a fastener, it will be appreciated that the pin and box members 12 and 14 may be coupled to their respective components in any suitable fashion, including through threaded connections, studs, flanges, clamps, welding, or other mounting techniques. Indeed, in some embodiments, one or both of the pin and box members 12 and 14 may be provided as an integral part of such respective components. For instance, in one embodiment, the pin member 12 is integrally formed as a portion of a wellhead and the box member 14 is coupled to or integral with a production tree (e.g., a "Christmas tree") or other wellhead component to be mounted on the wellhead. While certain embodiments may be described in an oil or gas (or other resource) production context, it should be noted that the presently-disclosed connection system may also be used to couple components unrelated to oil or gas production in full accordance with the present techniques.

In the presently illustrated embodiment, the box member 14 includes a bore 22 and the pin member 12 includes a bore 20. Various additional components may be received within either or both of the bores 20 and 22. For example, in one embodiment, various additional components 24, such as hangers, pipes, tubing, wellhead members, other fluid conduits, or the like may be received within the bores 20 and/or 22 of the box member 14 and the pin member 12. In the presently illustrated embodiment, the components 24 include a hanger and a fluid conduit that are secured within the bore 20 via locking rings 26, though other securing means are also envisaged. In one embodiment, the internal fluid conduit includes a bore 28, which is generally aligned with the bore 22 when the pin and box members 12 and 14 are connected to one another. Various seals 30 and/or seal rings 32 may be provided throughout the system to inhibit fluid leakage from the various bores of the system 10.

In one embodiment, to facilitate coupling of the pin member 12 and the box member 14, the collar 16 is threaded onto the box member 14 via mating threaded surfaces 34 and 36. The collar 16 may also include recesses 38, which are configured to receive set screws that prevent further rotation of the collar 16 with respect to the box member 14. The exemplary collar 16 is configured to receive an end 44 of the pin member 12, in addition to a portion of the box member 14, such that the pin member 12 and the box member 14 may be secured to one another in an end-to-end arrangement. Notably, in the presently illustrated embodiment, the collar 16 also includes an aperture or window 40 that facilitates user access to the load ring 50 and installation of the key 60 to secure the pin and box members 12 and 14 to one another, as discussed in further detail below.

Figure 3:
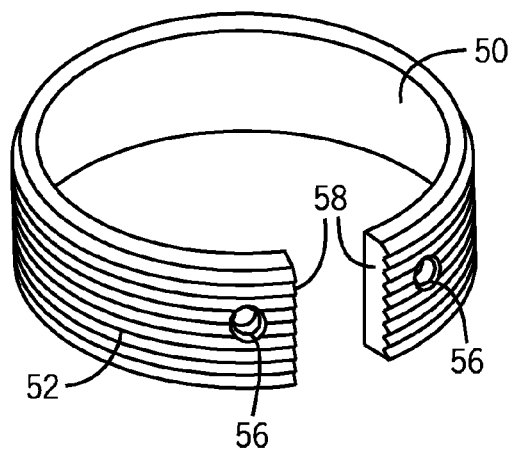
FIG. 3 is a perspective view of an exemplary load ring in accordance with one embodiment of the present invention.
Figure 4:
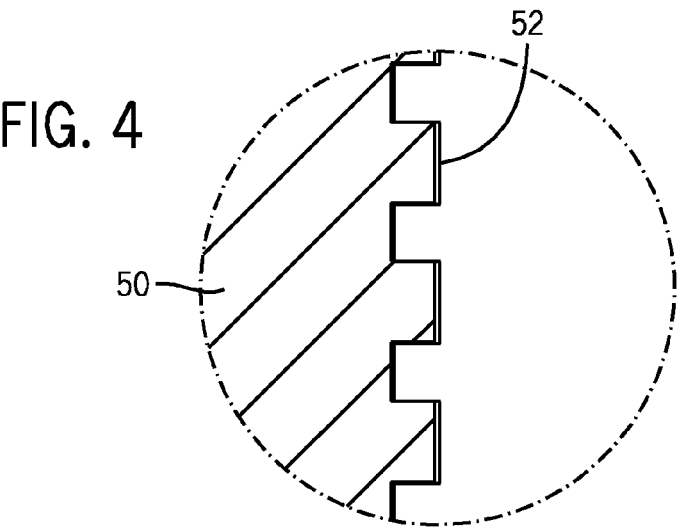
FIG. 4 illustrates an exemplary toothed surface of the load ring of FIG. 3 that may be provided in accordance with certain embodiments of the present invention.
Figure 5:
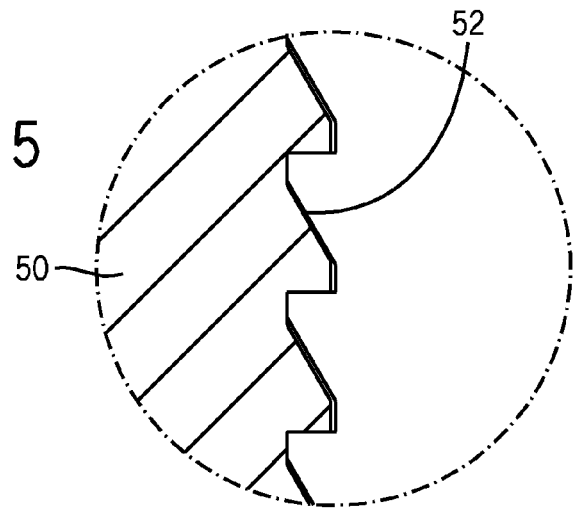
FIG. 5 illustrates a different exemplary toothed surface of the load ring of FIG. 3 in accordance with certain embodiments of the present invention.
Figure 7:
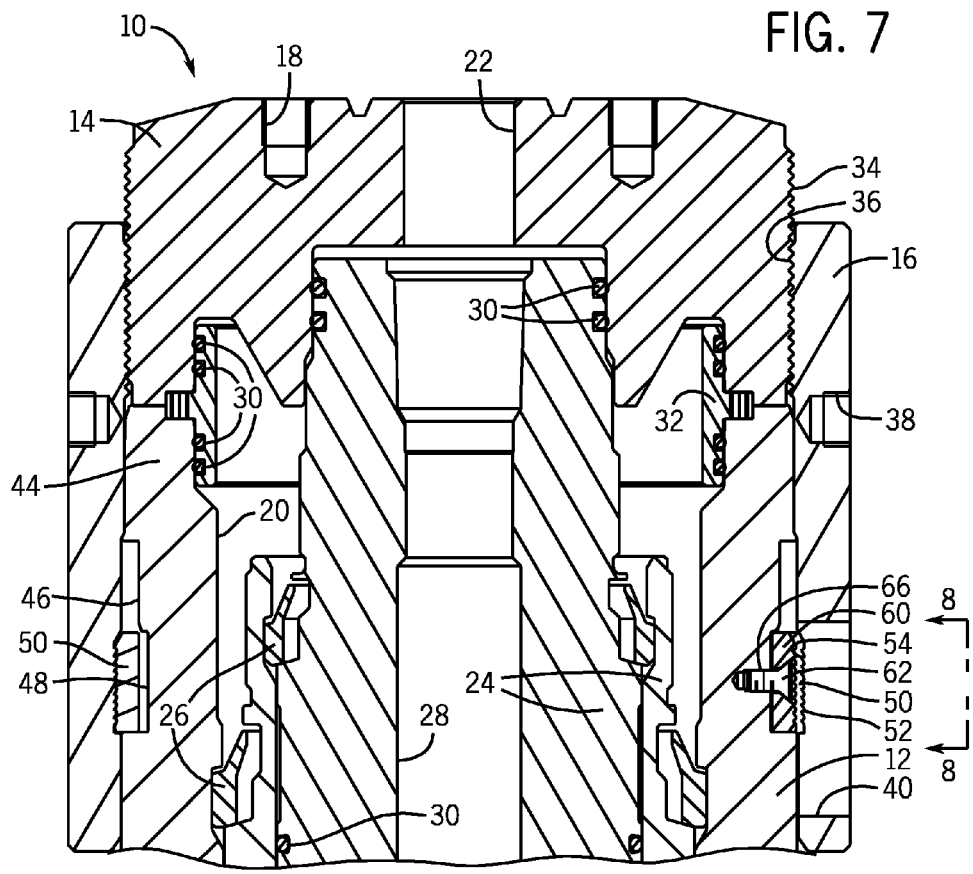
FIG. 7 is a cross-sectional view of the system of FIG. 6, illustrating the installation of a key through a window of the collar and within the additional groove in accordance with one embodiment of the present invention.

To facilitate locking of the pin and box members 12 and 14 together, the pin member 12 of one embodiment includes grooves 46 and 48 for receiving a load ring 50 and a locking key 60 (FIG. 7). The load ring 50, as depicted in FIG. 3 in accordance with one embodiment of the present invention, is configured to engage the collar 16 when the pin member 12 (and at least a portion the groove 46 and/or 48 containing the load ring 50) is inserted into the collar 16. In some embodiments, the load ring 50 includes a grooved surface, such as a number of teeth or threads 52 configured to engage a plurality of complimentary teeth or threads 54 provided on an inner surface of the collar 16. Such teeth 52 and 54 may be provided in various configurations, such as helical or other threads, rectangular teeth or angled teeth (as generally depicted in FIGS. 4 and 5, respectively), or the like. In some embodiments, the load ring 50 may be a split ring, such as a C-ring. Additionally, in one embodiment, the load ring 50 includes apertures 56 adjacent circumferential ends 58 (defined by a split in the load ring 50) that facilitate securing of the load ring 50 to the pin member 12 as discussed in greater detail below.

Figure 6:
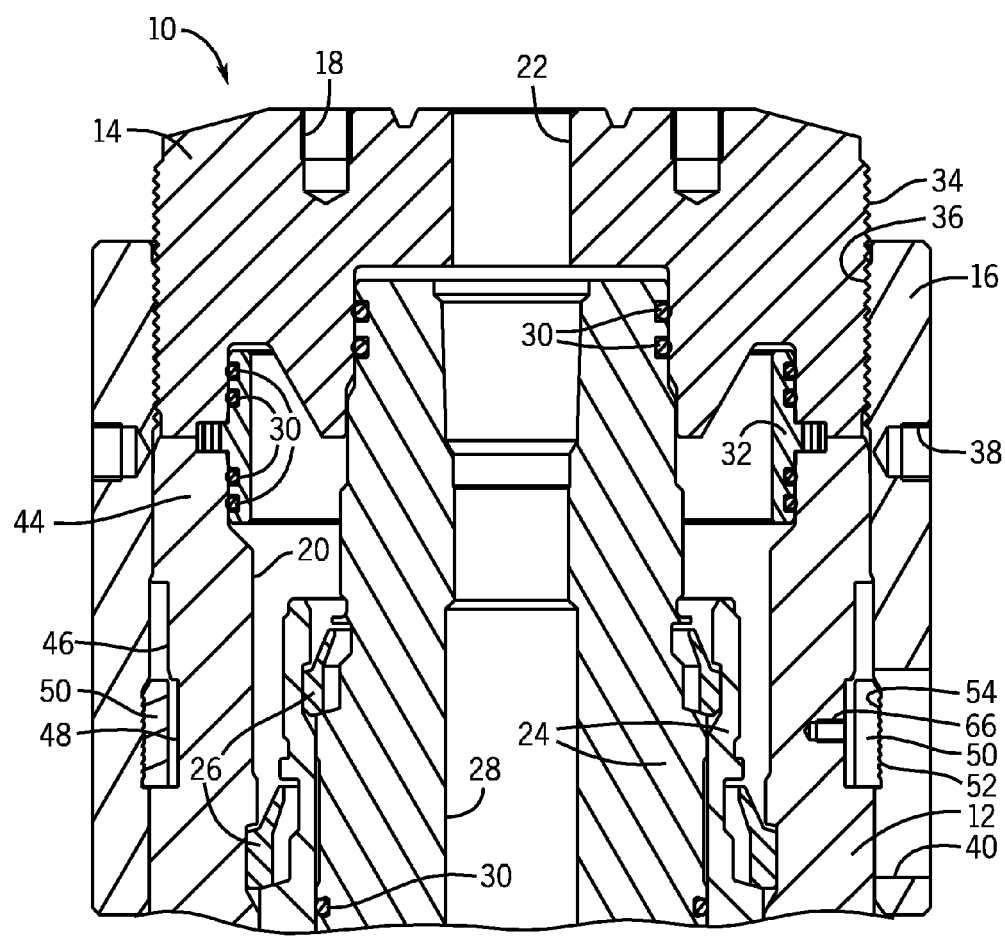
FIG. 6 is a cross-sectional view of the system of FIG. 2, illustrating the stabbing of one connection member to the other connection member and the movement of the load ring into an additional groove in accordance with one embodiment of the present invention.
Figure 8:
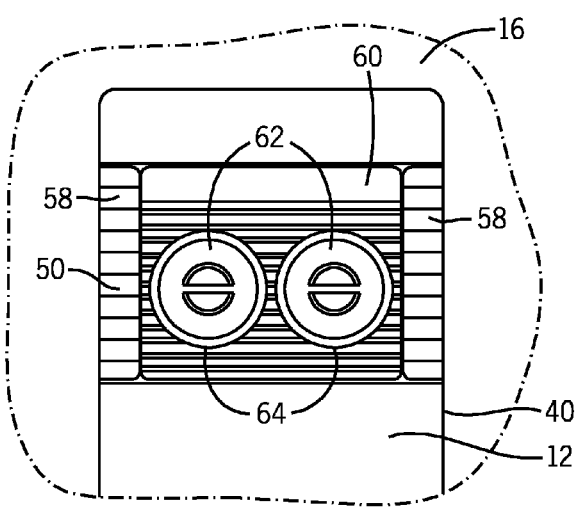
FIG. 8 is a partial detail view generally taken along line 8-8 of FIG. 7, illustrating the key secured to the connection member with a pair of set screws and portions of the load ring accessible through the window of the collar in accordance with one embodiment of the present invention.

The load ring 50 may initially be positioned within the groove 46, as illustrated in FIG. 2. In one embodiment, when the pin and box members 12 and 14 are initially joined or "stabbed" to one another, the teeth or threads 54 of the collar 16 engage the mating surface of the load ring 50 and guide the load ring 50 from the upper groove 46 to the lower groove 48, as generally depicted in FIG. 6. Once the load ring 50 is moved into the groove 48, a locking key or cotter 60 may be installed through the window 40 of the collar 16 and secured to the pin member 12 between opposing ends 58 of the load ring 50, as generally illustrated in FIGS. 7 and 8. It will be appreciated that, while the exemplary window 40 of FIG. 8 is presently illustrated as a generally rectangular window, other configurations (e.g., elliptical, circular, or the like) may also be employed. In one embodiment, the key 60 is secured within the groove 48 via one or more set screws 62 inserted through respective apertures 64 of the key 60 and into threaded recesses 66 of the pin member 12. The key 60 may have a toothed and/or threaded outer surface, although a key 60 having some other outer surface contour may instead be employed in full accordance with the present techniques. The key 60 facilitates positive engagement of the load ring 50 with the collar 16, and generally prevents the collar 16 from contracting within the groove 48.

Figure 9:
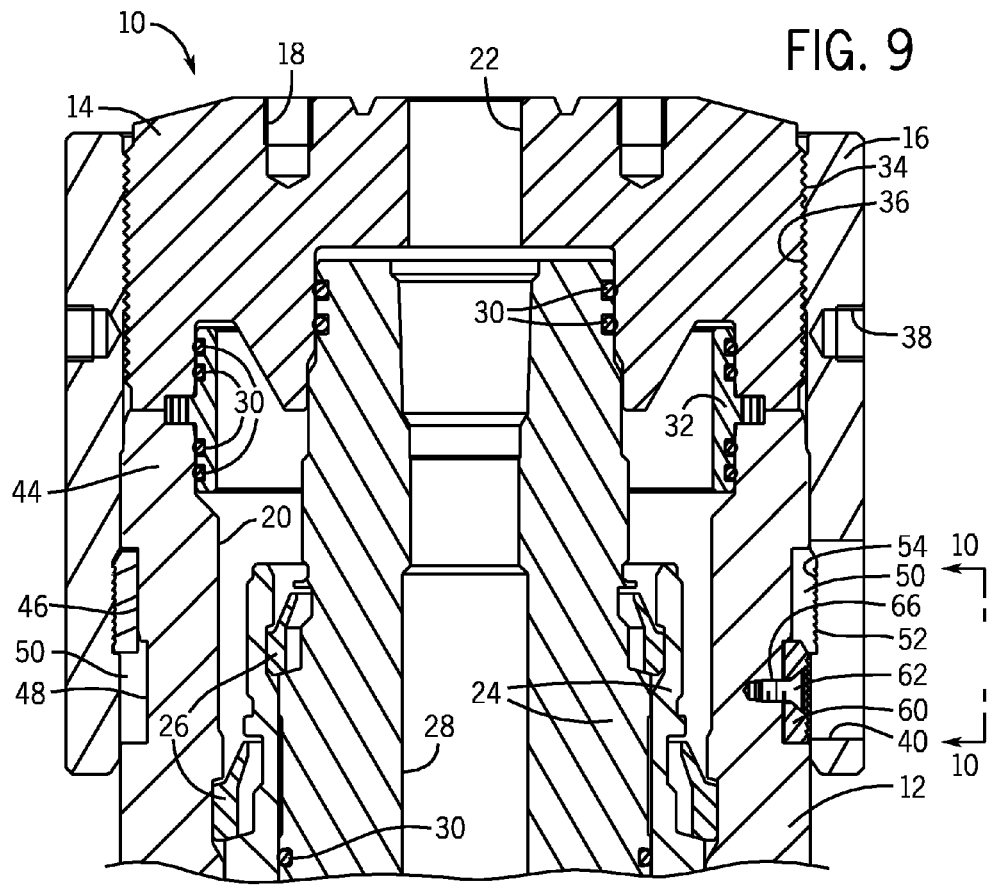
FIG. 9 is a cross-sectional view of the system of FIG. 7, illustrating the rotation of the collar to draw the load ring away from the installed key and into the upper groove of the connection member in accordance with one embodiment of the present invention.
Figure 10:
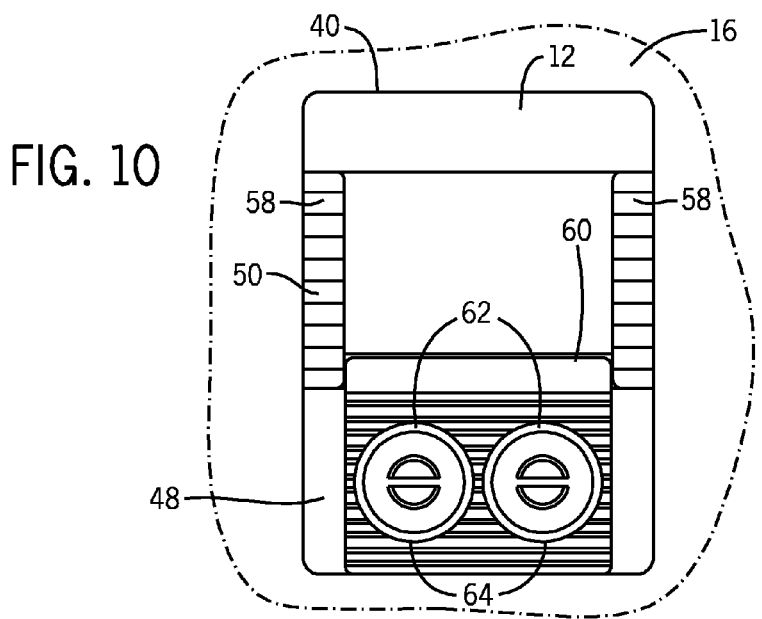
FIG. 10 is a partial detail view generally taken along line 10-10 of FIG. 9, illustrating the relative positions of the load ring and the installed key through the window of the collar in accordance with one embodiment of the present invention.

In some embodiments, following installation of the key 60 within the groove 48, the collar 16 may be rotated on the threads 34 of the box member 14 such that the load ring 50 is drawn from the groove 48 into the groove 46 and axial clearance, or "slack," in the connection between the pin member 12 and the box member 14 is removed, as generally depicted in FIGS. 9 and 10. Further, once such slack is removed, the collar 16 may be further rotated to preload the connection between the pin member 12 and the box member 14. In some embodiments, the groove 46 is sized such that positive engagement of the load ring 50 to the collar 16 is maintained not only by the installed key 60, but also by the groove itself. Also, in at least one embodiment, the rotation of the collar 16 on the threads 34 is the only rotation needed in the system 10 to couple the pin member 12 to the box member 14. A cover plate (not shown) may be provided over or within the window 40 to protect the connection between the collar 16 and the load ring 50.

It should be noted that, in the presently illustrated embodiment, the collar 16, the load ring 50 and the locking key 60 are members of a low-profile, or slender, connector suitable for use in an array of connection applications, including those that may provide a limited amount of space for connecting various members, such as in certain conductor-sharing, split-compact, and/or stacked wellheads. Further, it will be appreciated that the present system 10 allows for simple installation and coupling of two tubular members or components. Additionally, the pin and box members 12 and 14 may also be disconnected from one another in a simple and convenient fashion, as discussed below.

Figure 11:
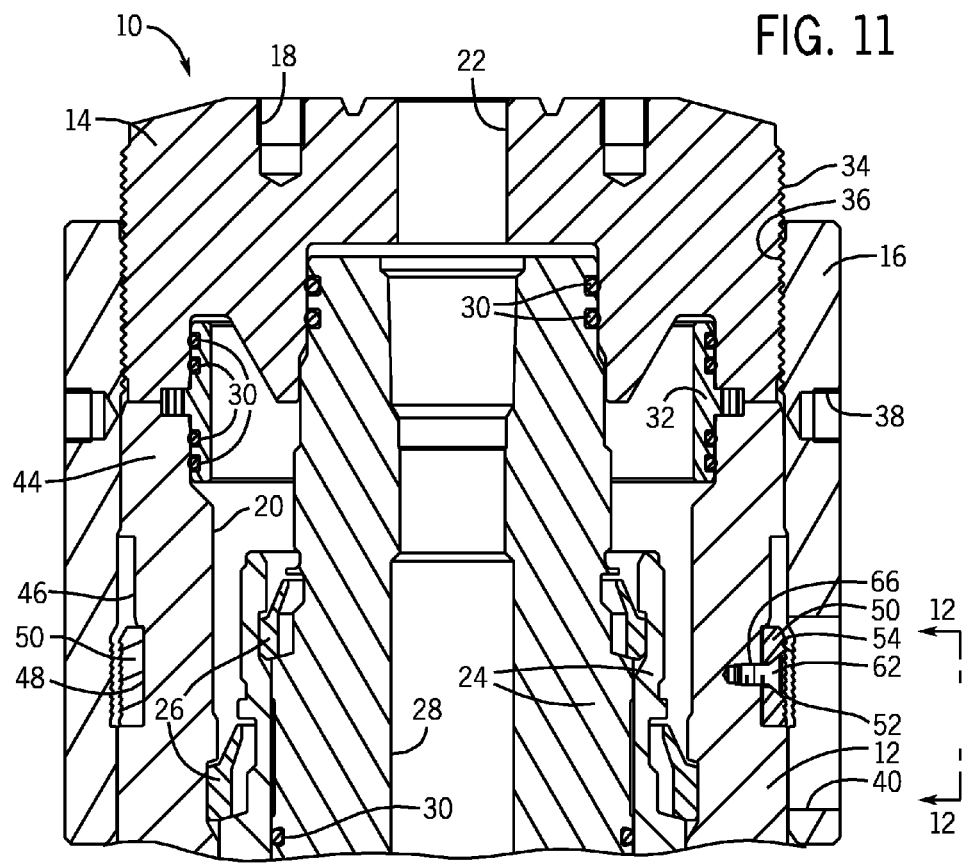
FIG. 11 is a cross-sectional view of the system of FIG. 9, illustrating the securing of the load ring within the additional groove, following the removal of the key and rotation of the collar, to facilitate disconnection of the two connection members in accordance with one embodiment of the present invention.
Figure 12:
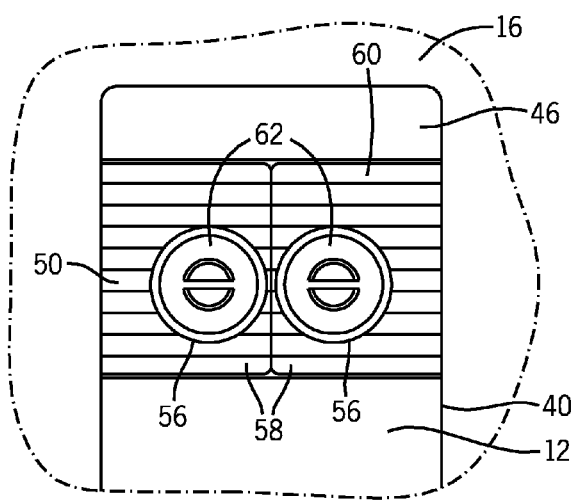
FIG. 12 is a partial detail view generally taken along line 12-12 of FIG. 11, illustrating the fastening of the load ring to the connection member via a pair of set screws in accordance with one embodiment of the present invention.
Figure 13:
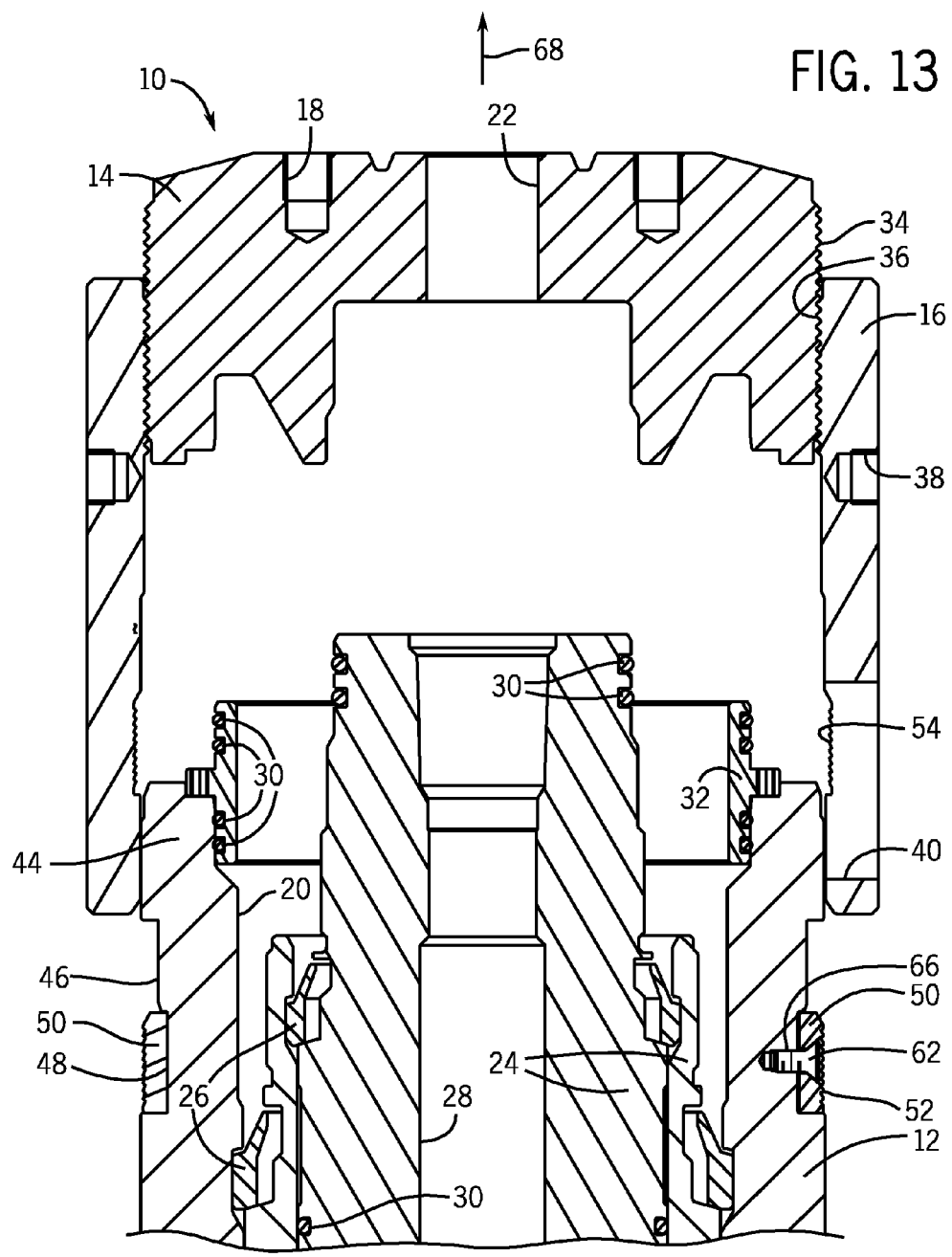
FIG. 13 is a cross-sectional view of the system of FIG. 11, illustrating the removal of the connection members from one another in accordance with one embodiment of the present invention.
Figure 14:
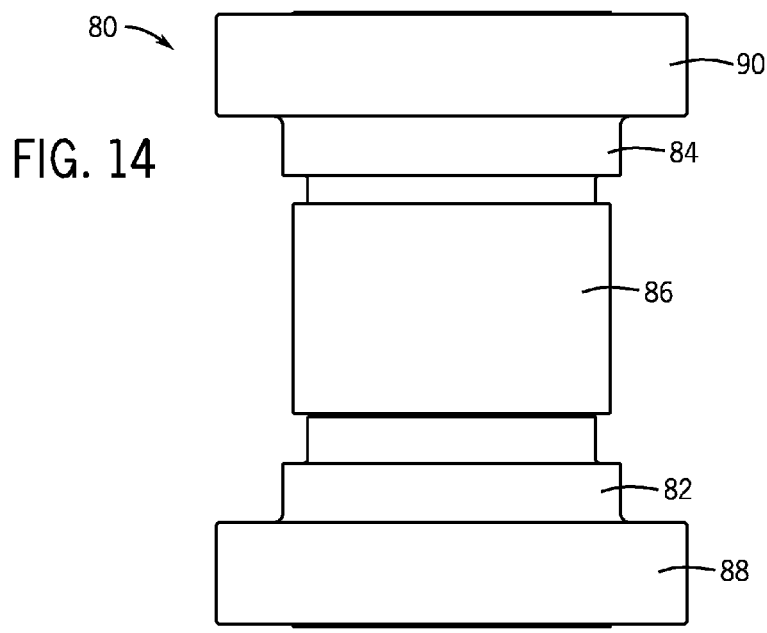
FIG. 14 is a front elevational view of a system including two connection members coupled to one another via a collar in accordance with certain embodiments of the present invention.
Figure 15:
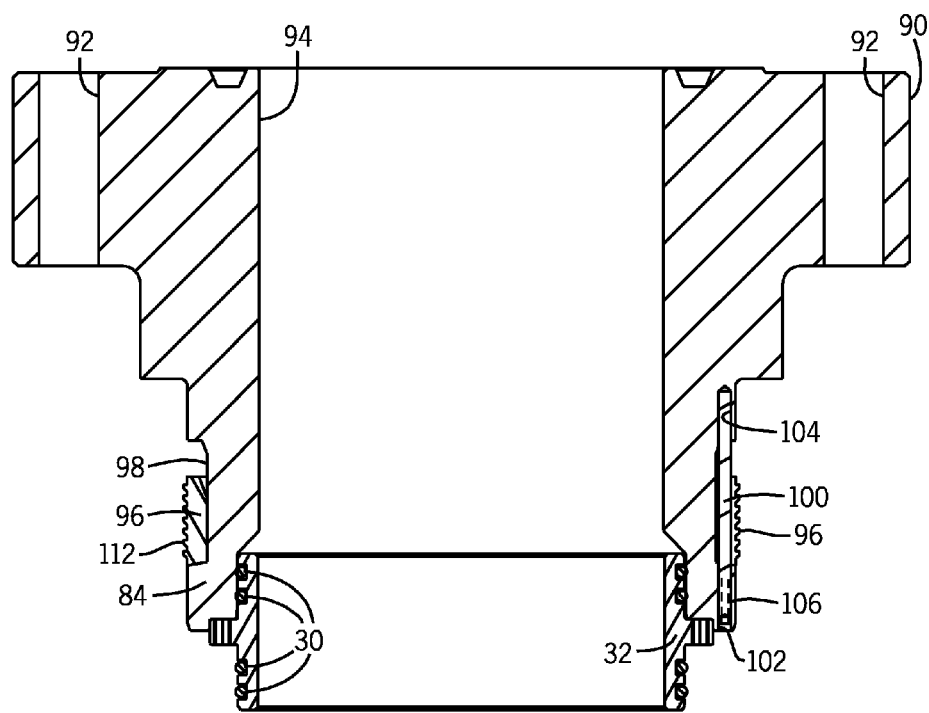
FIG. 15 is a cross-sectional view of one of the connection members of FIG. 14, including a load ring disposed in a groove of the connection member and an anti-rotation rod that inhibits rotation of the load ring within the groove in accordance with one embodiment of the present invention.

For instance, an exemplary manner of uncoupling the pin member 12 from the box member 14 is generally illustrated in FIGS. 11-13. In some embodiments, the pin and box members 12 and 14 may be disengaged by removing the key 60 from the groove 48 via the window 40, rotating the collar 16 to guide the load ring 50 from the groove 46 to the groove 48, and securing the load ring 50 to the pin member 12 via the set screws 62. For example, in one embodiment, the set screws 62 are removed from the key 60 (allowing the key 60 to be removed from the assembly through the window 40), and the set screws 62 are then inserted through the apertures 56 of the load ring 50 and into the recesses 66 to disengage the teeth or threads 52 from the mating teeth or threads 54 of the collar 16. In one embodiment, a C-clamp may be employed, such as in conjunction with a pair of mandrels temporarily inserted in the apertures 56, to facilitate disengagement of the load ring 50 from the collar 16, alignment of the apertures 58 with the recesses 66, and securing of the load ring 50 to the pin member 12 via the set screws 62. Depending on the relative size of the window 40 and the area to which it provides access, the key 60 may be removed prior to or following movement of the load ring 50 (via rotation of the collar 16) out of the groove 46 and into the groove 48. The box member 14 may then be pulled apart from the pin member 12, as generally represented by the arrow 68 in FIG. 13.

An exemplary connection system 80 is generally illustrated in FIGS. 14-20 in accordance with another embodiment of the present invention. The exemplary system 80 includes a pin member or component 82 that is configured to be coupled to a box member or component 84 via a collar 86 and load rings 96 and 126, as discussed in greater detail below. The pin member 82 and the box member 84 may include respective flanges 88 and 90 to facilitate coupling of the members to other components, such as a pipe, a wellhead component, or the like. It will be appreciated that, as discussed above with respect to exemplary system 10, the pin and box members 82 and 84 may be coupled to other respective components in any suitable fashion, with or without flanges 88 and 90, or may be provided as an integral part of such respective components. In one embodiment, the system 80 may be employed to couple a production tree to a wellhead, although other applications are also envisaged.

Additional details of the exemplary system 80, as well as an exemplary method for coupling the pin and box members 82 and 84 to one another, may be better understood with reference to FIGS. 15-20. In the embodiment illustrated in FIG. 15, the box member 84 includes a plurality of mounting holes 92 in the flange 90 to facilitation attachment of the box member 84 to some other component, such as a production tree. The box member 84 also includes a bore 94. Although the bore 94 is illustrated as a generally straight bore for the sake of clarity, it should be noted that additional components may be installed within the bore 94, and that the bore 94 may have some other configuration, such as one similar or identical to the box member 14 (FIG. 2), for example.

In one embodiment, a load ring 96 is disposed within a circumferential groove 98 in a surface of the box member 84. In some embodiments, the load ring 96 is a split load ring, such as a C-ring. In such embodiments, an anti-rotation rod or pin 100 may be inserted through an aperture 102 of the box member 84 and a split in the load ring 96, and into a recess 104 of the box member 84. In one embodiment, an end 106 of the anti-rotation rod 100 includes a threaded outer surface configured to engage a complimentary surface in the recess 102 to secure the anti-rotation rod 100 within the box member 84. It may be appreciated that installation of the anti-rotation rod 100 in the box member 84 and between corresponding end portions of the load ring 96 generally prevents rotation of the load ring 96 within the groove 98.

Figure 16:
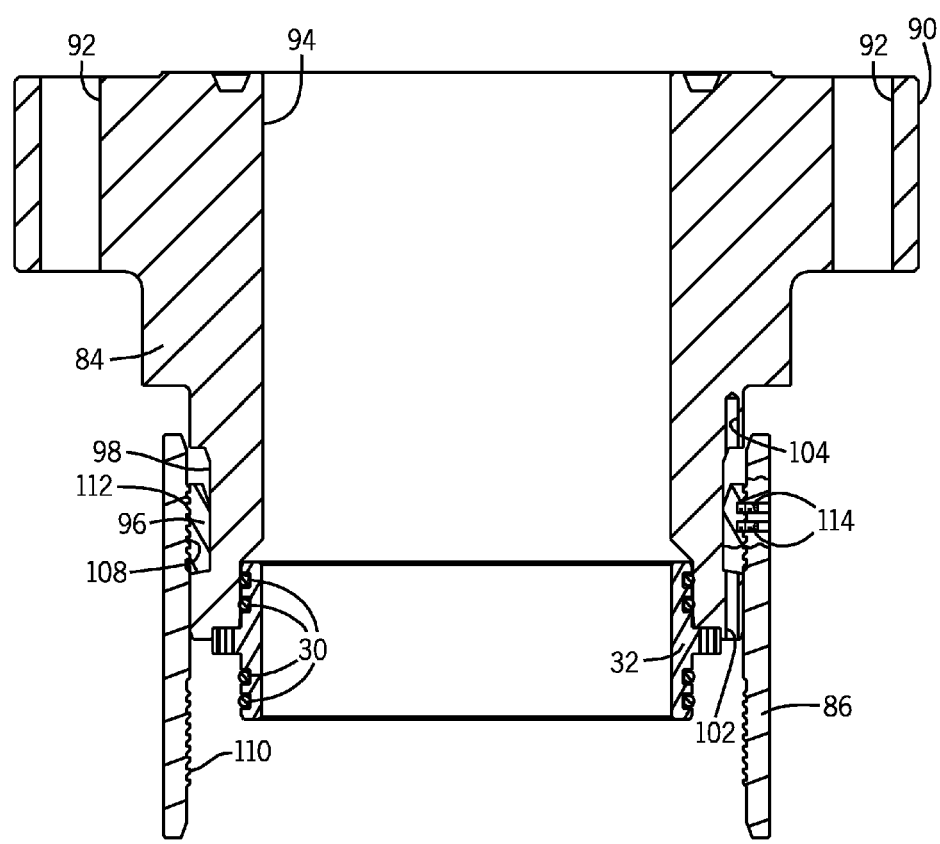
FIG. 16 is a cross-sectional view of the connection member of FIG. 15 following the coupling of a collar to the load ring and removal of the anti-rotation rod in accordance with one embodiment of the present invention.

Once the load ring 96 and the anti-rotation rod 100 are installed in the box member 84, the collar 86 (which includes grooved, threaded, or toothed surfaces 108 and 110) may be coupled to the box member 84 via the load ring 96. For instance, in one embodiment, the anti-rotation rod 100 generally prevents rotation of the load ring 96 while the collar 86 is threaded onto the load ring 96 via complimentary threaded surfaces 108 and 112. Further, in some embodiments, the collar 86 may be secured to the load ring 96 in some additional or alternative manner, such as through the use of set screws 114. Such set screws may be provided at one or more various points along the circumference of the collar 86. Once the collar 86 is secured to the load ring 96, the anti-rotation rod 100 may be removed from the box member 84, such as generally illustrated in FIG. 16. It should be noted that, upon removal of the anti-rotation rod 100, the load ring 96 is free to rotate within the groove 98, allowing complimentary rotation of the collar 86 about an end of the box member 84 without relative movement between the collar 86 and the load ring 96.

Figure 17:
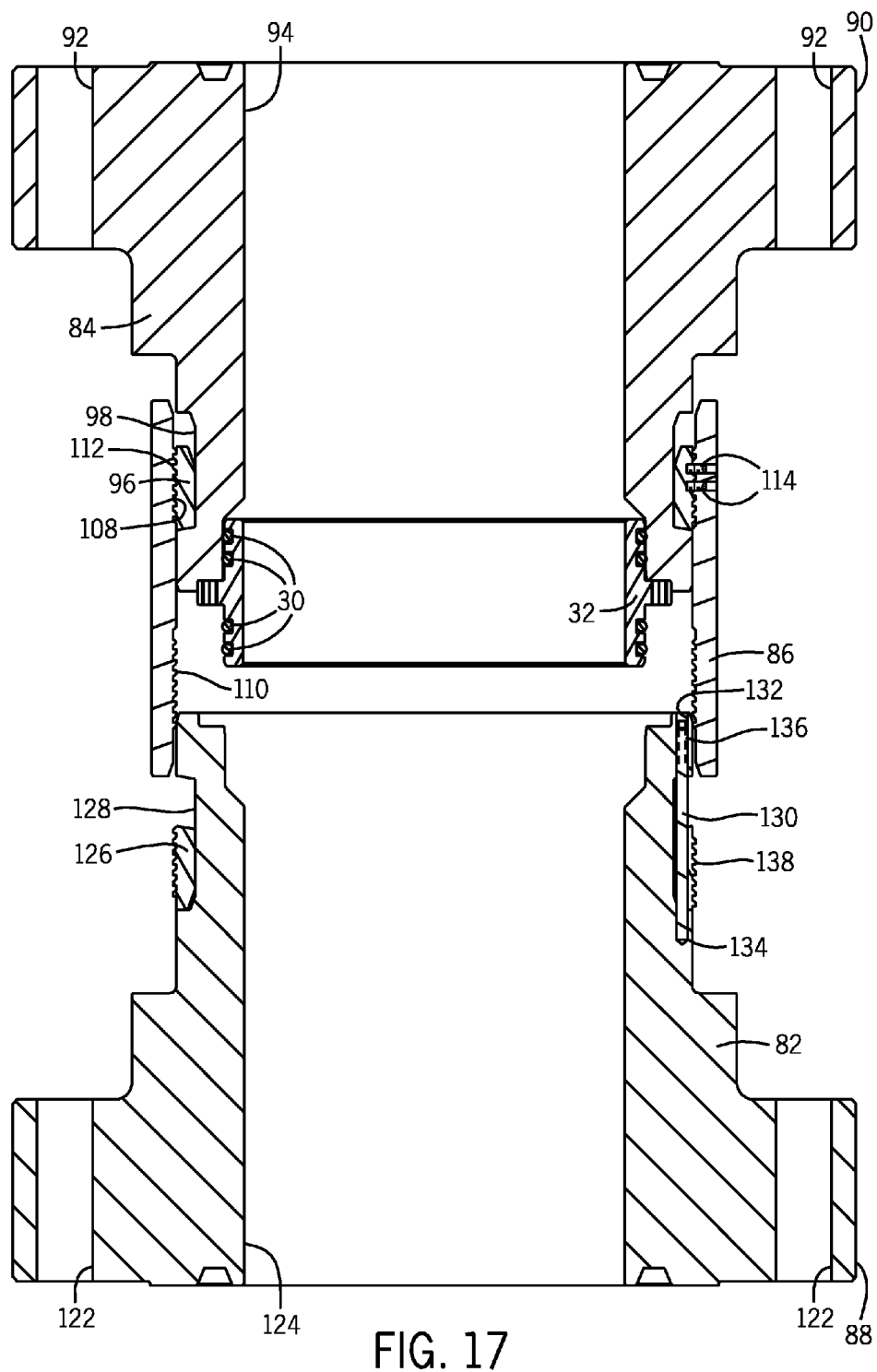
FIG. 17 is a cross-sectional view of the system of FIG. 15, illustrating the alignment of the connection member illustrated in FIG. 16 to an additional connection member having a load ring disposed in a groove and an anti-rotation rod, and illustrating the initial engagement of the collar with the load ring of the additional connection member in accordance with one embodiment of the present invention.

The box member 84 and the collar 86 may then be aligned over the pin member 82, as generally illustrated in FIG. 17. Similar to the flange 90 of the box member 84, a plurality of mounting holes 122 may be provided in the flange 88 to facilitate coupling of the pin member 82 to other components, such as a wellhead component. While the pin member 82 is presently illustrated with a generally straight bore 124, it will be appreciated that the bore 124 may have other configurations in different embodiments, and that various components, such as hangers, tubing, or the like may be installed within the bore 124, as similarly discussed above with respect to the bore 20 of the exemplary system 10. Additionally, various components installed within the bore 124 may provide a plurality of separate bores for fluid conveyance. Seals 30 and/or seal rings 32 may be included at various locations in the system to inhibit fluid leakage from the bores of the system 80.

In the presently illustrated embodiment, the pin member 82 includes a load ring 126 disposed within a circumferential groove 128. Further, in one embodiment, the load ring 126 includes at least one split, such as in a C-ring or a multi-piece ring. An anti-rotation rod or pin 130 is installed through an aperture 132, the groove 128, and a split in the ring 126, and into a recess 134 of the pin member 82. The anti-rotation rod 130 may also include a threaded portion 136 configured to mate with a complimentary surface of the aperture 132 to secure the anti-rotation rod 130 within the pin member 82. In some embodiments, the anti-rotation rod 130 may be substantially similar to the anti-rotation rod 100. Indeed, in one embodiment, the anti-rotation rod 100 may be removed from the box member 84, as discussed above, and installed in place of the anti-rotation rod 130 within the pin member 82.

Figure 18:
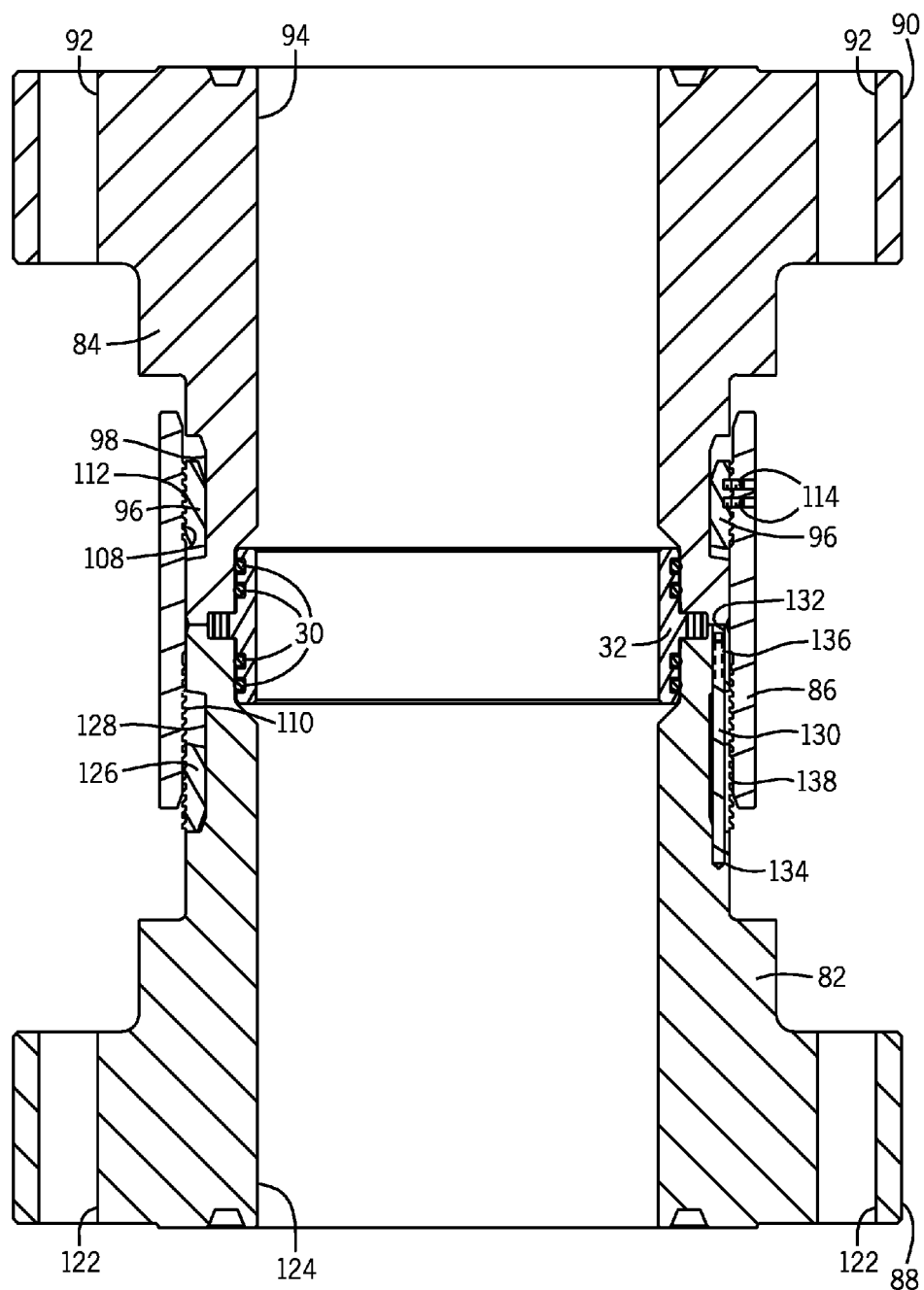
FIG. 18 is a cross-sectional view of the system of FIG. 17, illustrating the threading of the collar onto the lower load ring to draw the upper and lower load rings toward one another in accordance with one embodiment of the present invention.
Figure 19:
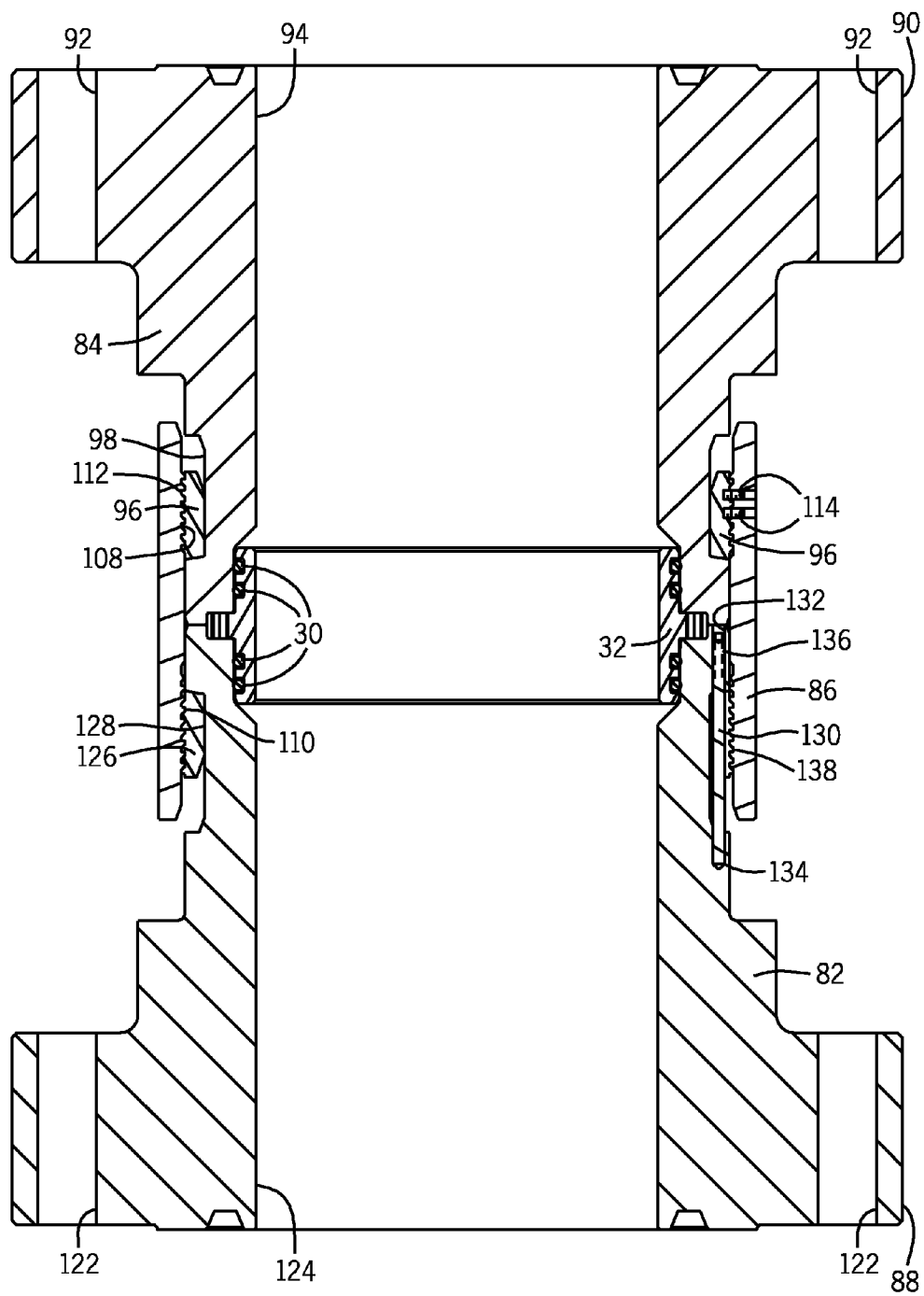
FIG. 19 is a cross-sectional view of the system of FIG. 18, illustrating further rotation of the collar to secure the connection members to one another via the two load rings in accordance with one embodiment of the present invention.

Once the pin and box members 82 and 84 are aligned, the collar 86 may be rotated such that the threaded surface 110 of the collar 86 engages a complimentary threaded surface 138 of the load ring 126, as generally illustrated in FIG. 18. Notably, the anti-rotation rod 130 inhibits rotation of the load ring 126, causing rotation of the collar 86 in a first direction to induce axial movement of the load ring 126 within the groove 128 toward the load ring 96. Continued rotation of the collar 86 in the same direction removes slack from the connection and secures the pin member 82 and the box member 84 to one another, as generally illustrated in FIG. 19. It should be noted that the collar 86 may be still further rotated in the same direction to preload the connection.

Figure 20:
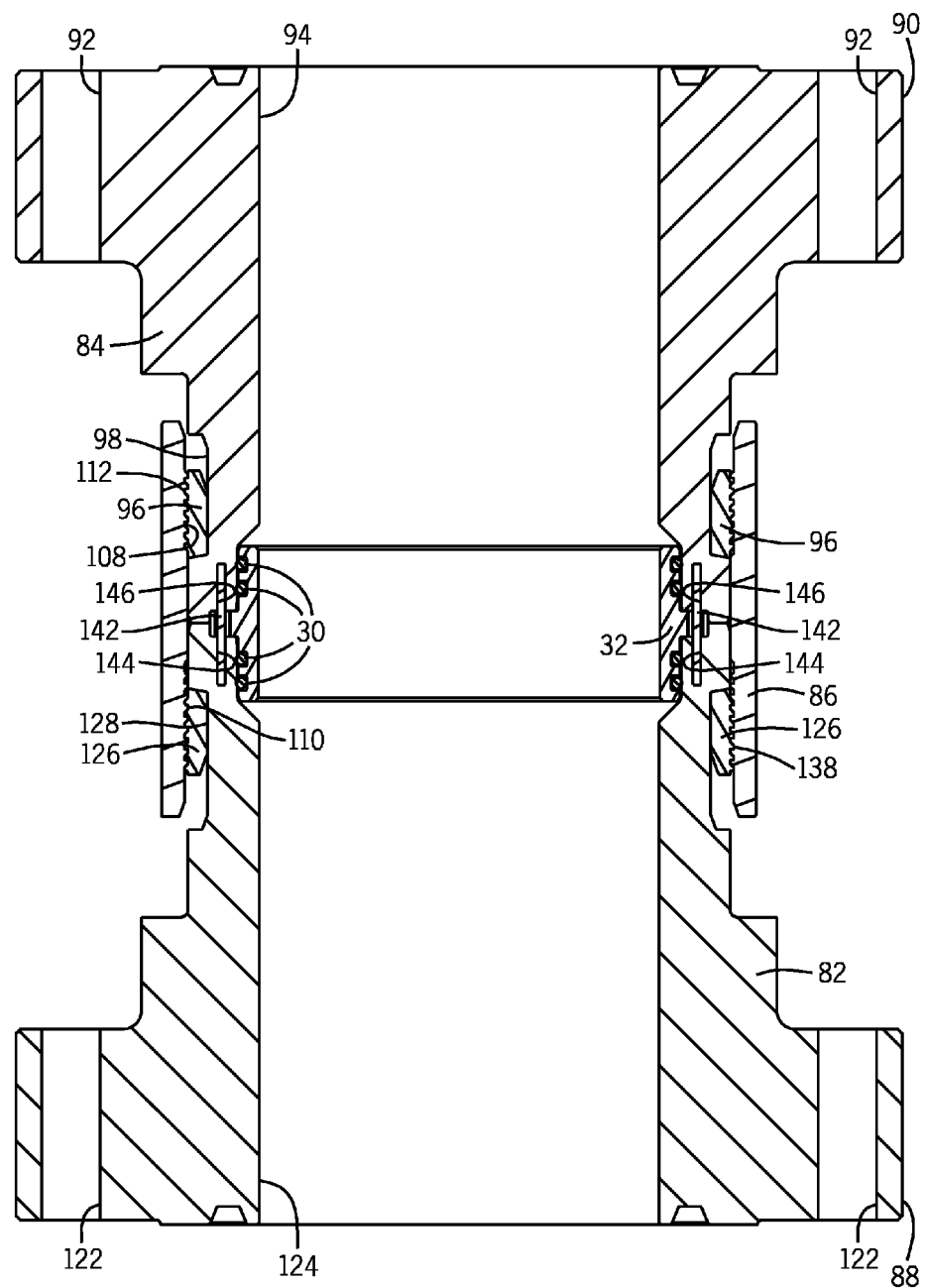
FIG. 20 is a cross-sectional view of the system of FIG. 19, in which the viewing plane is offset about the axis of the system with respect to the viewing plane of FIG. 19, illustrating alignment pins that may be provided in accordance with one embodiment of the present invention.
Figure 21:
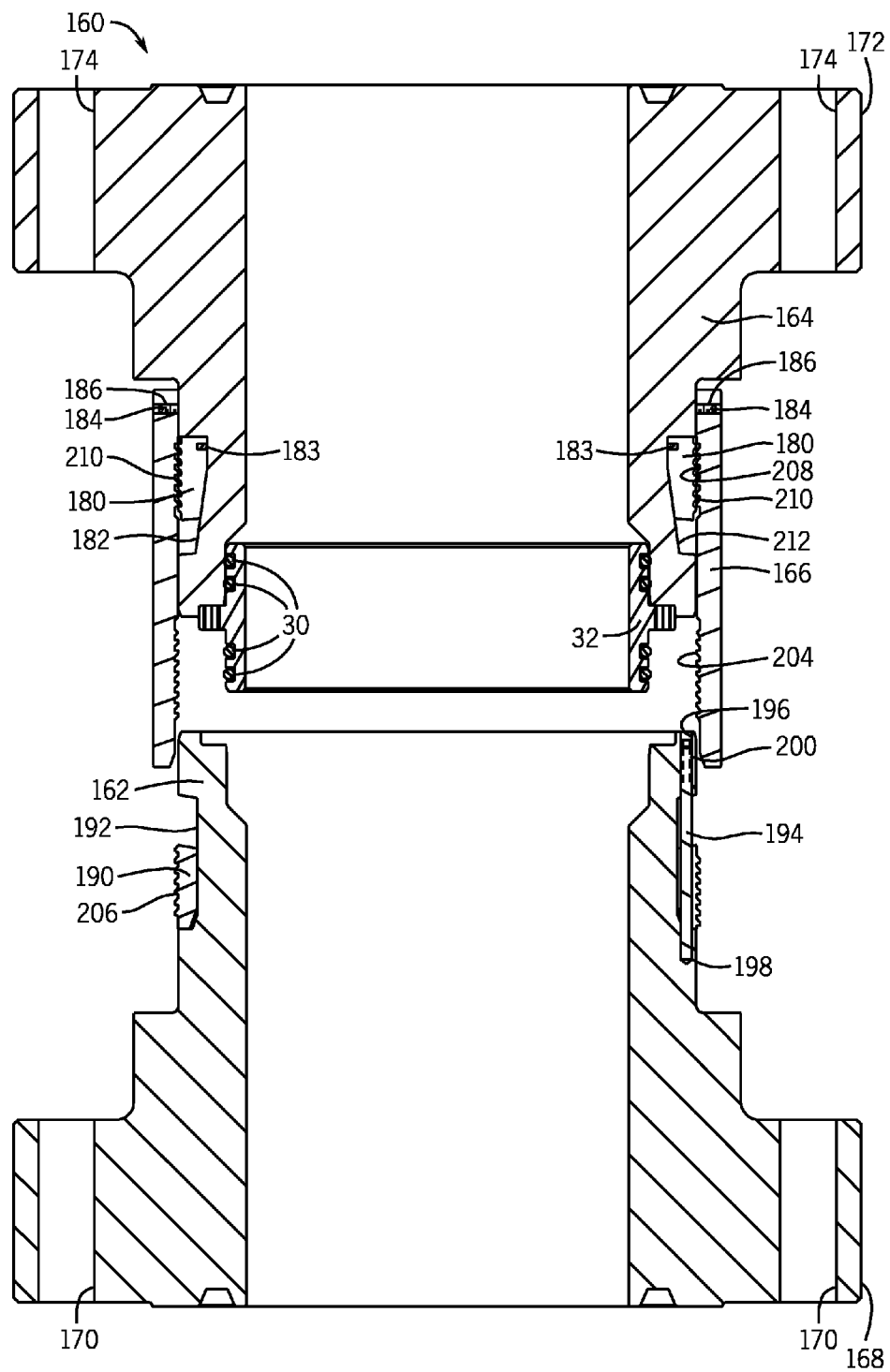
FIG. 21 is an exploded cross-sectional view of another exemplary connection system in accordance with one embodiment of the present invention.

In one embodiment, alignment pins 142 may be provided and configured to cooperate with respective recesses 144 and 146 to facilitate alignment of the pin and box members 82 and 84 during an exemplary coupling process, as generally illustrated in FIG. 20. It should be noted that, as presently illustrated, such alignment pins 142 may be provided at different circumferential locations than the installation points for the anti-rotation rods 100 and 130. Further, it will be appreciated that, in other embodiments, such alignment pins 142 may be formed integrally with either or both of the pin and box members 82 and 84. Disconnection of the pin and box members 82 and 84 may be effected through rotation of the collar 86 (in a second direction opposite that discussed above), causing the load rings 96 and 126 to move away from one another and the collar 86 to disconnect from the load ring 126, thus allowing the pin and box members 82 and 84 to be pulled apart from one another.

An exemplary connection system 160 is generally illustrated in FIGS. 21-24 in accordance with an additional embodiment of the present invention. The exemplary system 160 includes a pin member or component 162 and a box member or component 164 configured to be coupled to one another by way of a collar 166 and load rings 180 and 190, as discussed in greater detail below. The pin and box members 162 and 164 may be configured to be mounted to additional components or devices, such as wellhead components, production trees, pipes, other conduits, or the like. In one embodiment, the pin and box members include flanges 168 and 172 having respective mounting holes 170 and 174. From the above discussion, however, it will be appreciated that the pin and box members 162 and 164 may be coupled to other respective components in any suitable fashion, or may be provided as an integral part of such respective components. In one embodiment, the system 160 may be employed to couple a production tree to a wellhead, although the system may be employed to couple a variety of other components to one another. Additionally, although illustrated with generally-straight bores, it will be appreciated that the pin and box members 162 and 164 may include a variety of bore configurations, and may be adapted to receive various additional components, as discussed above with respect to other embodiments. Further, seals 30 and/or seal rings 32 may be provided throughout the system to inhibit fluid leakage from the various bores of the system 160.

In one embodiment, a load ring 180 is disposed within a groove 182 of the box member 164. In some embodiments, the load ring 180 is a split load ring, such as a C-ring or, as depicted in the presently illustrated embodiment, a segmented load ring having a plurality of ring segments. In the case of the latter, a snap ring 183 may be provided to facilitate alignment of the various ring segments of the load ring 180 within the groove 182. The collar 166 may be fitted over an end of the box member 164 and the load ring 180, and then secured to the box member 164. In one embodiment, the collar 166 is secured directly to the body of the box member 164 via one or more set screws 184 inserted through respective apertures 186. In other embodiments, the collar 166 can be coupled to the box member 164 via other suitable techniques, including through connections formed with the load ring 180.

In some embodiments, the pin member 162 also includes a load ring 190 disposed within a groove 192. Further, in the presently illustrated embodiment, the load ring 190 includes a ring having at least one split, such as a C-ring or a multi-piece ring. An anti-rotation rod or pin 194 may be inserted through an aperture 196 and the split in the load ring 190, and received in a recess 198 of the pin member 162. The anti-rotation rod 194 may also include a threaded portion 200 configured to mate with a complimentary surface of the aperture 196 to secure the anti-rotation rod 194 within the pin member 162. As similarly discussed above, the anti-rotation rod 194 generally prevents rotation of the load ring 190 within the groove 192.

Figure 22:
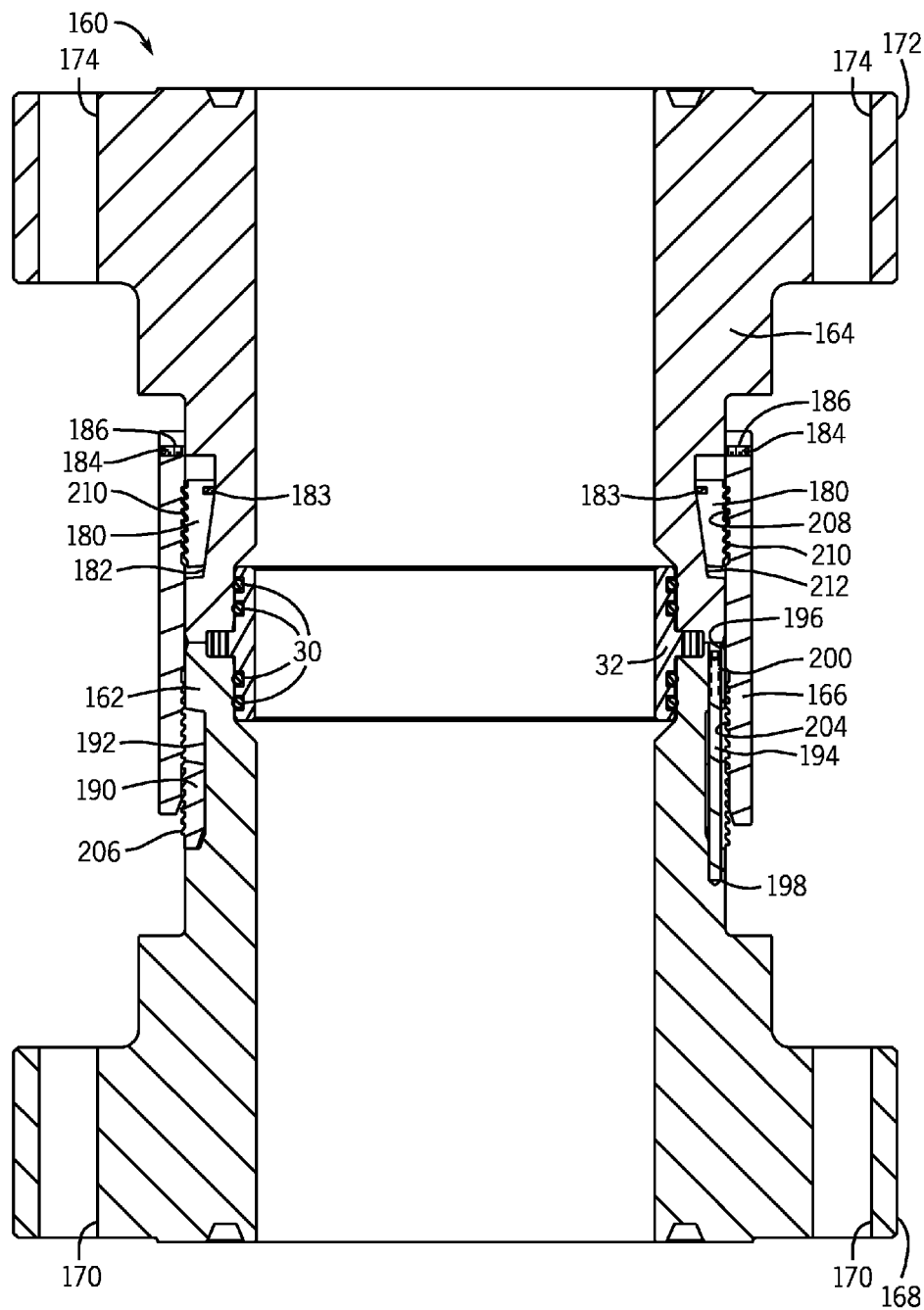
FIG. 22 is a cross-sectional view of the system of FIG. 21, illustrating the alignment of the two connection members to one another in accordance with one embodiment of the present invention.

Subsequently, the box member 164 may be placed in axial alignment over the pin member 162 and the set screws 184 may be loosened such that the collar 166 is positioned against the load ring 190 and is free to move with respect to the box member 164, as generally illustrated in FIG. 22. The collar 166 may be moved to couple the collar 166 to the load ring 190. For example, in one embodiment, the collar 166 is moved downwardly toward the load ring 190 and rotated to thread the collar 166 onto the load ring 190 via mating grooved or threaded surfaces 204 and 206. As noted above, the anti-rotation rod 194 generally prevents rotation of the load ring 190 with the collar 166, causing the load ring 190 to be drawn into the collar 166 and toward the load ring 180 upon rotation of the collar in a first direction.

Figure 23:
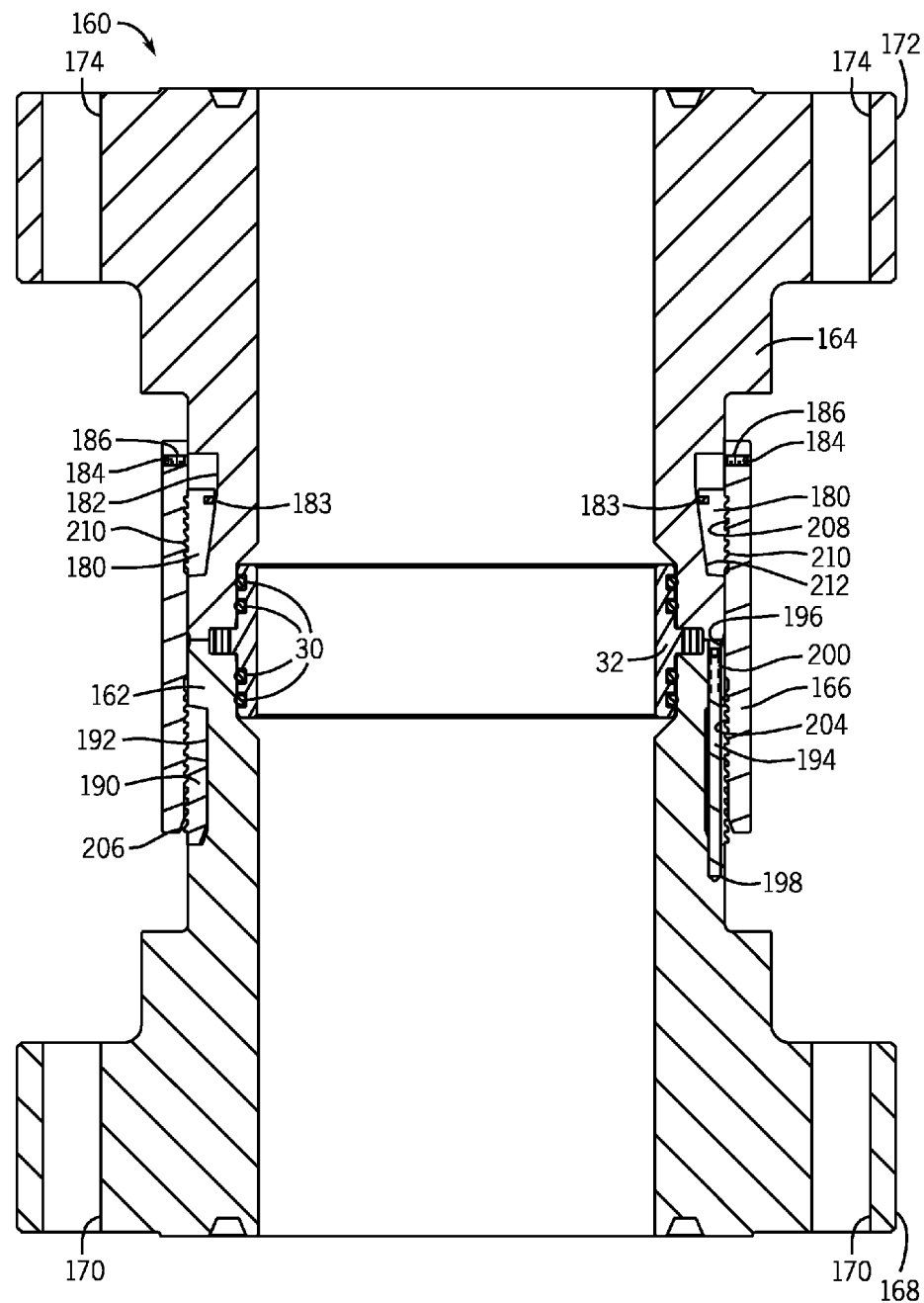
FIG. 23 is a cross-sectional view of the system of FIG. 22, illustrating movement of the collar to engage a load ring in a lower connection member and a plurality of ring segments in an upper connection member in accordance with one embodiment of the present invention.
Figure 24:
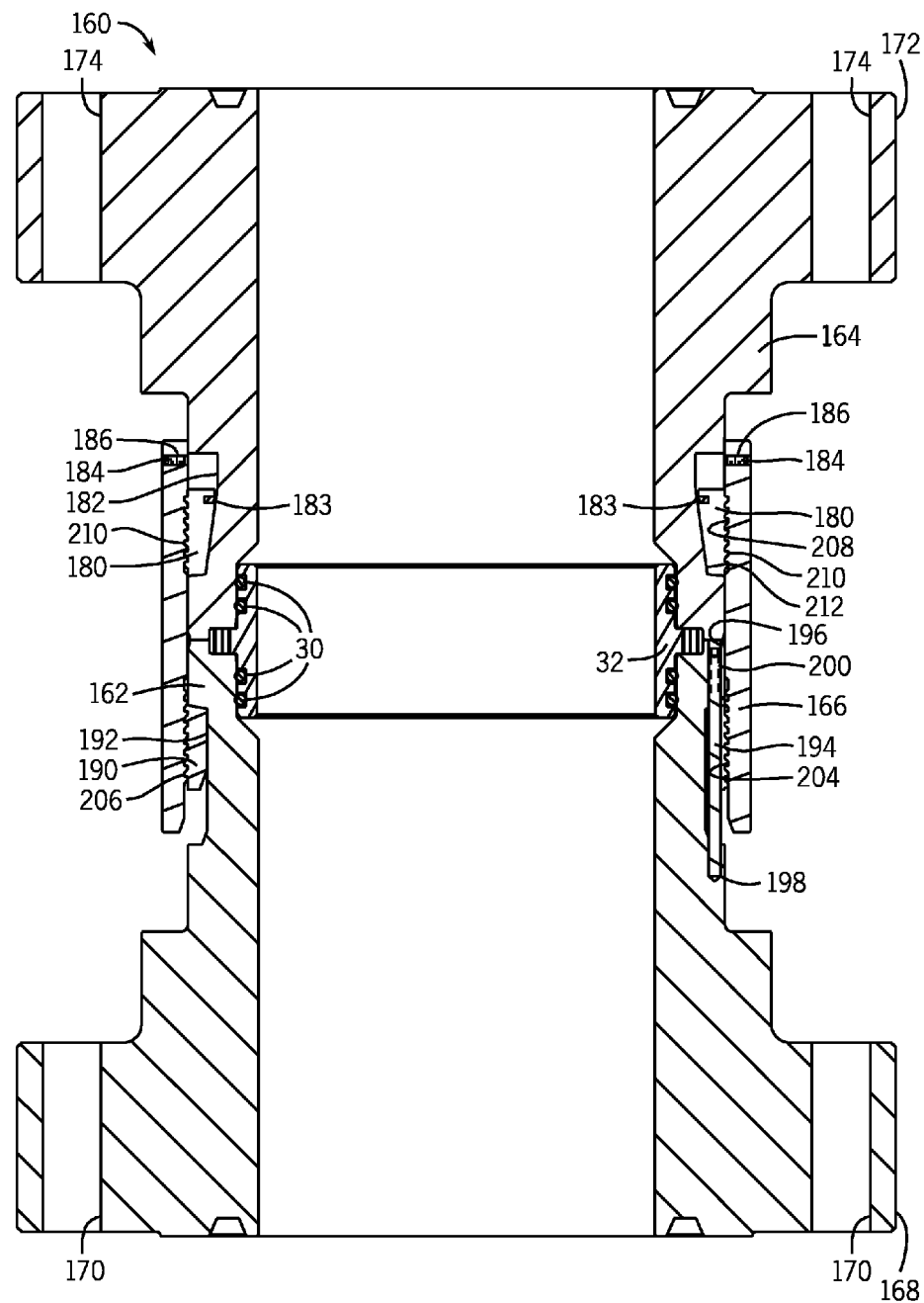
FIG. 24 is a cross-sectional view of the system of FIG. 23, illustrating the securing of the two connection members to one another via the load ring, the collar, and the plurality of ring segments in accordance with one embodiment of the present invention.

Additionally, a grooved portion 208 of the collar 166 may be configured to mate with one or more complimentary surfaces 210 of the load ring 180. In one embodiment, various ring segments of the load ring 180 slide down a tapered portion 212 of the groove 182, facilitating positive engagement between the ring segments and the grooved portion 208 of the collar 166, as generally illustrated in FIGS. 22 and 23. As a result of the mating engagement of the collar 166 with both load rings 180 and 190, continued rotation of the collar 166 draws the load rings 180 and 190 toward the sides of their respective grooves, removes slack from the connection, and secures the pin and box members 162 and 164 together, as generally illustrated in FIG. 24. Further torque may be applied to the collar to provide a preloaded connection of the pin member 162 to the box member 164. The pin and box members 162 and 164 may be disconnected by rotating the collar 166 in a second direction, opposite the first, until the collar 166 is free from the load ring 190. Once free, the collar 166 may then be secured to the box member 164, such as via set screws 184, and the pin and box members 162 and 164 may be pulled apart from one another.

It should be noted that certain embodiments of the present invention generally include low-profile connectors suitable for use in an array of connection applications, including those that may provide a limited amount of space for connecting various members, such as in certain conductor-sharing, split-compact, and/or stacked wellheads. Further, it will be appreciated that various embodiments of such connection systems may generally provide high-strength connectors that facilitate quick coupling and uncoupling of two tubular members or components.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
 a coupling, comprising:
  a collar comprising first threads along a first end portion and second threads along a second end portion;
  a first load ring having first mating threads; and
  at least one anti-rotation structure configured to be disposed in a first position to block rotation of the first load ring and guide movement of the first load ring along a first axial path in a first threaded engagement between the collar and the first load ring, wherein the first threaded engagement comprises the first threads mated with the first mating threads, and the at least one anti-rotation structure is configured to be removed from the first position to enable rotation of the first load ring after the first load ring and the collar are coupled together via the first threaded engagement.

2. The system of claim 1, wherein the at least one anti-rotation structure comprises an axial structure, an axial opening, or a combination thereof.

3. The system of claim 1, wherein the first load ring comprises a first split load ring.

4. The system of claim 3, wherein the at least one anti-rotation structure is disposed in a first split in the first split load ring.

5. The system of claim 4, wherein the at least one anti-rotation structure comprises a key having a fastener receptacle to receive a radial fastener.

6. The system of claim 5, wherein the first split ring comprises a first fastener receptacle disposed in a first circumferential end portion and a second fastener receptacle disposed in a second circumferential end portion, the first and second circumferential end portions are disposed about the first split, and the first and second fastener receptacles are configured to receive respective first and second radial fasteners.

7. The system of claim 6, wherein the collar comprises a window selectively disposed about the key, the first circumferential end portion, and the second circumferential end portion.

8. The system of claim 1, wherein the at least one anti-rotation structure comprises a rod.

9. The system of claim 1, wherein the coupling comprises a second load ring having second mating threads configured to selectively mate with the second threads of the collar in a second threaded engagement.

10. The system of claim 9, wherein the at least one anti-rotation structure is configured to block rotation of the second load ring and guide movement of the second load ring along a second axial path in the second threaded engagement between the collar and the second load ring.

11. The system of claim 10, wherein the at least one anti-rotation structure comprises a common anti-rotation structure selectively used to guide movement of the first load ring along the first axial path in the first threaded engagement between the collar and the first load ring or to guide movement of the second load ring along the second axial path in the second threaded engagement between the collar and the second load ring.

12. The system of claim 10, wherein the at least one anti-rotation structure comprises a first anti-rotation structure configured to guide movement of the first load ring along the first axial path in the first threaded engagement between the collar and the first load ring and a second anti-rotation structure configured to guide movement of the second load ring along the second axial path in the second threaded engagement between the collar and the second load ring.

13. The system of claim 9, wherein the first load ring is disposed along a first groove in a first component, and the second load ring is disposed along a second groove in a second component.

14. The system of claim 13, wherein the first groove comprises a tapered groove.

15. The system of claim 13, wherein the collar is selectively fastened to the first component with one or more fasteners after the first load ring and the collar are coupled together via the first threaded engagement.

16. The system of claim 13, wherein the first load ring couples the collar to the first component and the second load ring couples the collar to the second component, wherein the first load ring and the collar are configured to rotate together to facilitate coupling of the second load ring and the collar via the second threaded engagement.

17. The system of claim 1, wherein the first load ring couples the collar to a first component, and the second threads couple the collar to a second component.

18. The system of claim 1, comprising one or more mineral extraction components coupled together via the coupling.

19. The system of claim 1, wherein the at least one anti-rotation structure is configured to block rotation of the first load ring relative to a first coupling portion, and the at least one anti-rotation structure is configured to guide movement of the first load ring along the first axial path relative to the first coupling portion.

20. The system of claim 1, wherein the at least one anti-rotation structure is configured to removably couple to the first load ring.

21. The system of claim 1, wherein the at least one anti-rotation structure extends axially along at least half of an entire axial length of the first load ring.

22. The system of claim 1, wherein the at least one anti-rotation structure extends axially along at least all of an entire axial length of the first load ring.

23. The system of claim 1, wherein the first load ring is configured to move along the first axial path relative to the at least one anti-rotation structure while the collar progressively threads with first load ring via the first threads mated with the first mating threads.

24. The system of claim 1, wherein the collar is configured to rotate relative to the first load ring while the at least one anti-rotation structure blocks rotation of the first load ring and guides movement of the first load ring along the first axial path.

25. The system of claim 1, wherein the collar is selectively fastened to the first load ring with one or more fasteners after the first load ring and the collar are coupled together via the first threaded engagement.

26. A system, comprising:
a coupling, comprising:
a collar comprising first threads along a first end portion and second threads along a second end portion;
a first split load ring having a first split between first opposite circumferential end portions of the first split load ring; and
a first anti-rotation structure configured to selectively mount in the first split between the first opposite circumferential end portions of the first split load ring, wherein the first anti-rotation structure is configured to block rotation of the first split load ring and guide movement of the first split load ring along a first axial path, wherein the first split load ring comprises first mating threads configured to selectively engage with the first threads during the movement of the first split load ring along the axial path.

27. The system of claim 26, comprising a second split load ring having a second split between second opposite circumferential end portions of the second split load ring, wherein the second split load ring comprises second mating threads configured to selectively engage with the second threads.

28. The system of claim 26, wherein the first anti-rotation structure is configured to extend lengthwise in an axial direction along the first split between the first opposite circumferential end portions of the first split load ring.

29. The system of claim 26, wherein the first anti-rotation structure is configured to block rotation of the first split load ring relative to a first coupling portion, the first anti-rotation structure is configured to guide movement of the first load ring along the first axial path relative to the first coupling portion, and the first anti-rotation structure is configured to removably couple to the first split load ring.

30. The system of claim 26, wherein the collar is configured to rotate relative to the first load ring while the first anti-rotation structure blocks rotation of the first load ring and guides movement of the first load ring along the first axial path.

31. A system, comprising:
a coupling, comprising:
a collar comprising first threads along a first end portion and second threads along a second end portion;
a split load ring having a split between first and second circumferential end portions of the split load ring, wherein the first and second circumferential end portions comprise respective first and second fastener receptacles configured to receive respective first and second radial fasteners, wherein the collar comprises a window selectively disposed about the first and second circumferential end portions.

32. The system of claim 31, comprising a key configured to selectively mount in the split between the first and second circumferential end portions of the split load ring.

33. A system, comprising:
a coupling, comprising:
a collar comprising first threads along a first end portion and second threads along a second end portion;
a first load ring having first mating threads, wherein the first load ring couples the collar to a first component, and the second threads couple the collar to a second component; and
at least one anti-rotation structure configured to block rotation of the first load ring and guide movement of the first load ring along a first axial path in a first threaded engagement between the collar and the first load ring, wherein the first threaded engagement comprises the first threads mated with the first mating threads.

* * * * *